US009177171B2

(12) United States Patent
Roitman et al.

(10) Patent No.: US 9,177,171 B2
(45) Date of Patent: Nov. 3, 2015

(54) ACCESS CONTROL FOR ENTITY SEARCH

(75) Inventors: Haggai Roitman, Yoknea'm Elit (IL); Sivan Yogev, Givat Haim Meuchad (IL)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/417,250

(22) Filed: Mar. 11, 2012

(65) Prior Publication Data
US 2013/0238659 A1 Sep. 12, 2013

(51) Int. Cl.
G06F 17/30 (2006.01)
G06F 21/62 (2013.01)

(52) U.S. Cl.
CPC .................................. *G06F 21/6227* (2013.01)

(58) Field of Classification Search
CPC .................. G06F 17/30622; G06F 2221/2141; G06F 12/1491; G06F 17/30321; G06F 17/30699; G06F 21/604
USPC .......................................... 707/781, 742, 783
See application file for complete search history.

(56) References Cited

U.S. PATENT DOCUMENTS

| | | | |
|---|---|---|---|
| 7,356,679 B1 * | 4/2008 | Le et al. ............................. | 713/1 |
| 7,409,406 B2 * | 8/2008 | Agrawal et al. ................ | 707/742 |
| 8,024,324 B2 | 9/2011 | Amitay et al. | |
| 8,639,625 B1 * | 1/2014 | Ginter et al. ..................... | 705/51 |
| 2005/0289333 A1 * | 12/2005 | Rothman et al. .................. | 713/1 |
| 2006/0036593 A1 * | 2/2006 | Dean et al. ..................... | 707/707 |
| 2006/0161811 A1 * | 7/2006 | Welts .............................. | 714/15 |
| 2007/0168478 A1 * | 7/2007 | Crosbie ........................ | 709/221 |
| 2007/0180509 A1 * | 8/2007 | Swartz et al. ...................... | 726/9 |
| 2007/0255698 A1 * | 11/2007 | Kaminaga et al. ................. | 707/3 |
| 2008/0082809 A1 * | 4/2008 | Rothman et al. ................... | 713/1 |
| 2008/0120350 A1 * | 5/2008 | Grabowski et al. ........... | 707/202 |
| 2008/0307343 A1 * | 12/2008 | Robert et al. ................. | 715/765 |
| 2009/0193102 A1 * | 7/2009 | Trujillo ......................... | 709/220 |
| 2010/0030878 A1 * | 2/2010 | Grabowski et al. ........... | 709/222 |
| 2010/0198804 A1 * | 8/2010 | Yaskin et al. ................. | 707/706 |
| 2011/0153644 A1 * | 6/2011 | Kosuru et al. ................. | 707/769 |

OTHER PUBLICATIONS

Balog et al., "Overview of the TREC 2009 entity track", Proceedings of TREC 2009, 2009.
Balog et al., "Entity search: building bridges between two worlds", Proceedings of SEMSEARCH 2010, 2010.

* cited by examiner

*Primary Examiner* — Robert Beausoliel, Jr.
*Assistant Examiner* — Alexandria Bromell
(74) *Attorney, Agent, or Firm* — Daniel Kligler, Esq.

(57) ABSTRACT

Method, system, and computer program product for access control for entity search are provided. The method includes: representing entity-relationship data in a conceptual model; representing entities in a search system as documents containing the entity's searchable content and metadata; defining authorization rules for searchers over entities and their relationships; and extending an entity document to include searchable tokens defining the authorization rules. Defining authorization rules may include: identifying query predicate constraints for entity search; and defining searchable tokens as paths for query predicates and permissible searchers; wherein the permissible searchers are permitted access to data based on a query that contains the predicate. Defining authorization rules may further include: defining searchable document files for a free-text predicate with a field name as a token of permissible searchers and the field value as the searchable content.

11 Claims, 11 Drawing Sheets

ACCESS CONTROL FOR ENTITY SEARCH

BACKGROUND

This invention relates to the field of access control for entity search. In particular, the invention relates to access control for entity search based on query semantics.

Entity search has recently attracted the attention of many researchers from a classical information retrieval (IR) perspective. This extension follows the observation that for many user queries, entities are more suitable for query satisfaction than full documents such as web-pages or scientific papers. A typical entity search scenario starts with a user query that describes an entity of interest and possibly additional constraints on the entity's relationships with other entities. The retrieval system task is then to retrieve all matching entities (or documents that mention them), ranked by their "relevance" to the user query. As an example, in a medical domain, a query like "Drug A" AND "patient" may require a search to discover medication entities that contain the term "Drug A" and which have at least one relationship with some patient entity (e.g., medications that were consumed by patients).

Many discovery systems in various domains, such as social, medical, enterprise, and customer relationship management (CRM), may benefit from exposing entity search services. Yet, many such systems may need a control on the level of information sharing during retrieval time in order to answer queries of authorized users and protect privacy. For example, in a medical domain, patients may wish to control who can search their personal health records and which portions of their data may be searchable (for example, physicians may fully search patient health records while others may search only medical data such as medical treatments for purposes of clinical trials).

BRIEF SUMMARY

According to a first aspect of the present invention there is provided a computer-implemented method for access control for entity search performed by a computerized device, comprising: representing entity data in a conceptual model; representing entities in a search system as documents containing the entity's searchable content and metadata; defining authorization rules for searchers over entities and their relationships; and extending an entity document to include searchable tokens defining the authorization rules.

A computer program product for aggregation of social network data, the computer program product comprising: a computer readable non-transitory storage medium having computer readable program code embodied therewith, the computer readable program code comprising: computer readable program code configured to: represent entity data in a conceptual model; represent entities in a search system as documents containing the entity's searchable content and metadata; define authorization rules for searchers over entities and their relationships; extend an entity document to include searchable tokens defining the authorization rules.

A system for aggregation of social network data on a user's local system, comprising: a processor; a model defining component for representing entity data in a conceptual model; an entity data translating component for representing entities in a search system as documents containing the entity's searchable content and metadata; a privacy policy defining component for defining authorization rules for searchers over entities and their relationships; and a document extending component for extending an entity document to include searchable tokens defining the authorization rules.

A method of providing a service to a customer over a network for access control for entity search, the service comprising: representing entity data in a conceptual model; representing entities in a search system as documents containing the entity's searchable content and metadata; defining authorization rules for searchers over entities and their relationships; and extending an entity document to include searchable tokens defining the authorization rules.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Method, system and computer program product are described in which an authorization model is provided for entity search, based on the extension of the traditional IR concept of access control lists (ACL) which can be efficiently implemented within an inverted index.

The described authorization model considers the query semantics and possible interpretations, and recognizes entity-based semantics.

Overall, the described authorization model is targeted for inverted index based architectures for entity-search and provides a fine-granular query semantic level authorization regardless of the type of underlining data format or types.

It may be assumed that entity and relationship data are represented using some conceptual model, e.g., the (entity-relationship) ER model. Within such a model, each entity e may have a type e.type (e.g., Patient, Medication, etc.), a set of one to many attributes a, each attribute may further have a name a.name and a value (e.g., Patient.age:20, Medication-.name:Drug A, etc.). A relationship r may include a name r.name and may capture an association between two or more entities (e.g. PatientMed).

It may be further assumed that each entity e is internally represented in the search system by a document d_e, containing the entity's searchable "content" and metadata. For example, the document may be a multi-field document (e.g., an Apache Lucene document, Apache Lucene is a trade mark of Apache Software Foundation.) Independently of the exact internal entity document representation within the underlining search system, the entity documents may be extended with special searchable tokens that are used for capturing various authorization rules over entities and their relationships.

The authorization model is built on top of the ACL concept, usually implemented by adding special document tokens. Traditionally, for a given query q and searcher identity id or group association (e.g., SysAdmins), ACL tokens containing the searcher id or group association are added to the query (e.g., q AND $ACL$:id) in order to filter out documents that the current searcher is not permitted to search.

An extension to the basic ACL mechanism is described using an entity-relationship ACL mechanism that is tightly coupled with the entity search system's query interpretations.

It may be assumed that queries can be broken into predicates based on their interpretations by the underlining entity search system. Each query predicate p constrains the entities that should be returned, and various predicates can be combined using Boolean expressions.

In the described embodiment, four unique query predicate constraints are identified for entity search, as follows:

Entity type predicates (e.g., e.type=Patient) which require to return entities of a certain type;

Entity attribute predicates (e.g., e.a=age:20) which require to return entities with certain attribute names and values;

Relationship predicates (e.g., r.name=PatientMed) further require to return entities that have certain relationships with others; and Free-text predicates (e.g., content="Drug A") may require to return query entities based solely on the content extracted from their attributes and relationships without any specific entity metadata in mind, treating entities as pure textual documents.

Each access control rule from a user's privacy policy may be mapped into a pair (predicate, permissible); predicate may be any of the above four basic predicate types while permissible may identify a specific authority, authority group (e.g., role=Physician), or $PUBLIC$ (for public access) that is permitted to access the user's data based on a query that contains the predicate. For a given user privacy policy which permits a return of the user's document whenever it satisfies the query predicate p submitted by a permissible searcher perm, the special ACL token $ACL$/p/perm may be added to that user's document in the search index.

Since the content of any entity's document is derived from the entity's data and metadata, special care is needed in order to support privacy given free-text queries which may refer to multiple entity types, attributes or relationships. For that, ACLs for free-text search may be implemented as searchable document fields rather than plain ACL tokens, with the field name being the $ACL$/content/permissible ACL token, and the field value containing the content of every entity type, attribute, or relationship values permitted to searchers identified by permissible. This in turn, allows the rewriting of text predicates during query runtime in such a way that only text tokens that were derived from permitted entity data and metadata will be searchable to the current searcher.

Finally, given the new set of ACL tokens, it is straight forward to rewrite any given searcher's query; a query is first broken into its basic predicates q.p, and then, each predicate is added with a proper ACL token.

Figure 1:
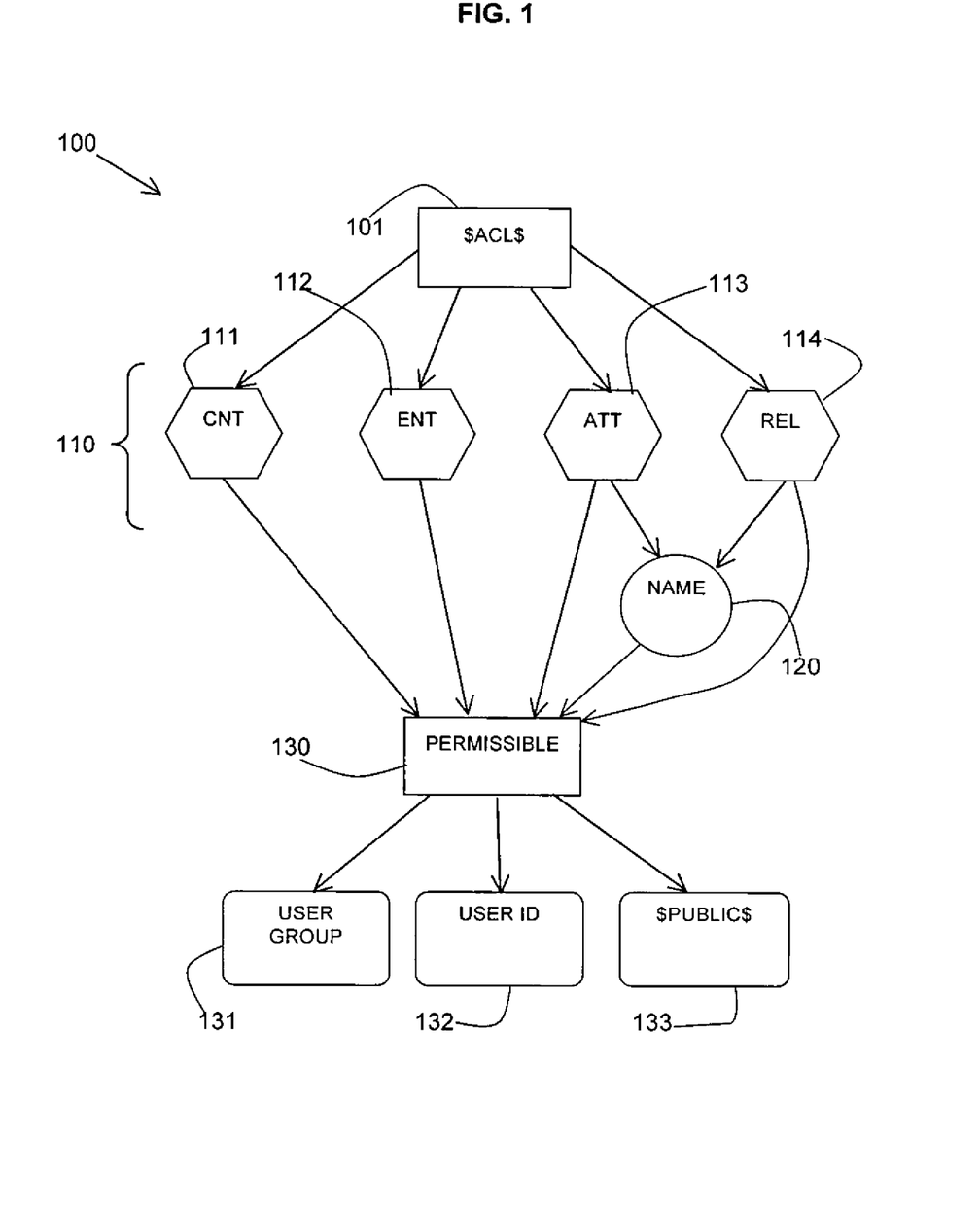
FIG. 1 is a schematic diagram of an authorization model aspect in accordance with the present invention.

Referring to FIG. 1, a schematic diagram shows an embodiment of an authorization model for entity search. FIG. 1 is represented as a directed acrylic graph (DAG) 100 which depicts an authorization model for entity search, with its "root" 101 being the prefix token $ACL$.

The next node level 110 in the graph semantically represents the four possible query predicates for entity search, with CNT 111, ENT 112, ATT 113, and REL 114 representing free-text, entity type, entity attribute, and relationship predicate ACLs. For entity attributes and relationships, the Name node 120 further denotes their name. Finally, the Permissible node 130 represents a searcher authority, identified either by a specific id 131, a user group 132, or any searcher 133 (denoted as $PUBLIC$). A direct path from the root 101 to the bottom nodes 131-133, therefore, can be translated into an ACL token by concatenating the node labels along the path.

Figure 2:
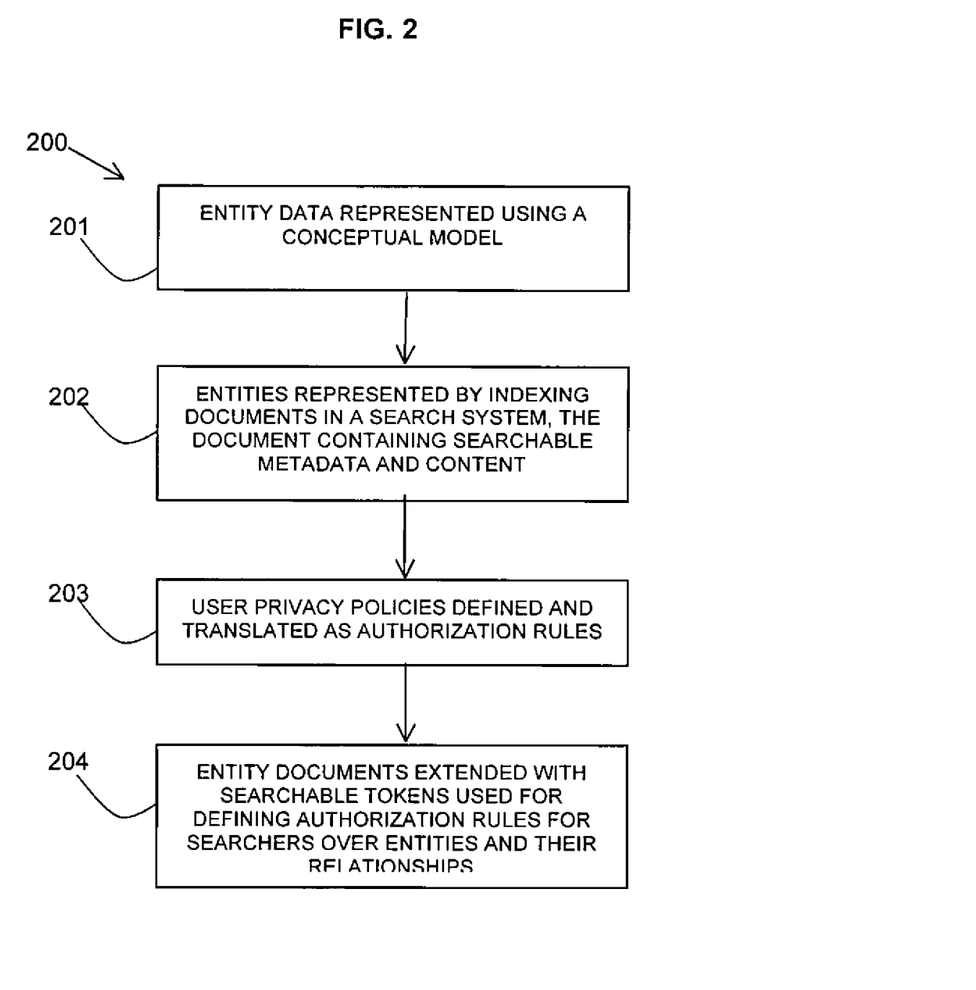
FIG. 2 is a flow diagram of a method in accordance with the present invention.

Referring to FIG. 2, a flow diagram 200 shows an embodiment of the described method. Entity data may be represented 201 using a conceptual model. The entity data may include relationship data defining relationships between entities. Entities may be represented 202 in a search system by indexing by documents containing searchable metadata and content. User privacy or access control policies may be defined and translated 203 as authorization rules at indexing time of the entity-relationship data. The entity documents may be extended 204 with searchable tokens used for capturing various authorization rules over entities and relationships. In particular, authorization rules or policies are defined for searchers over entities and their relationships.

Figure 3:
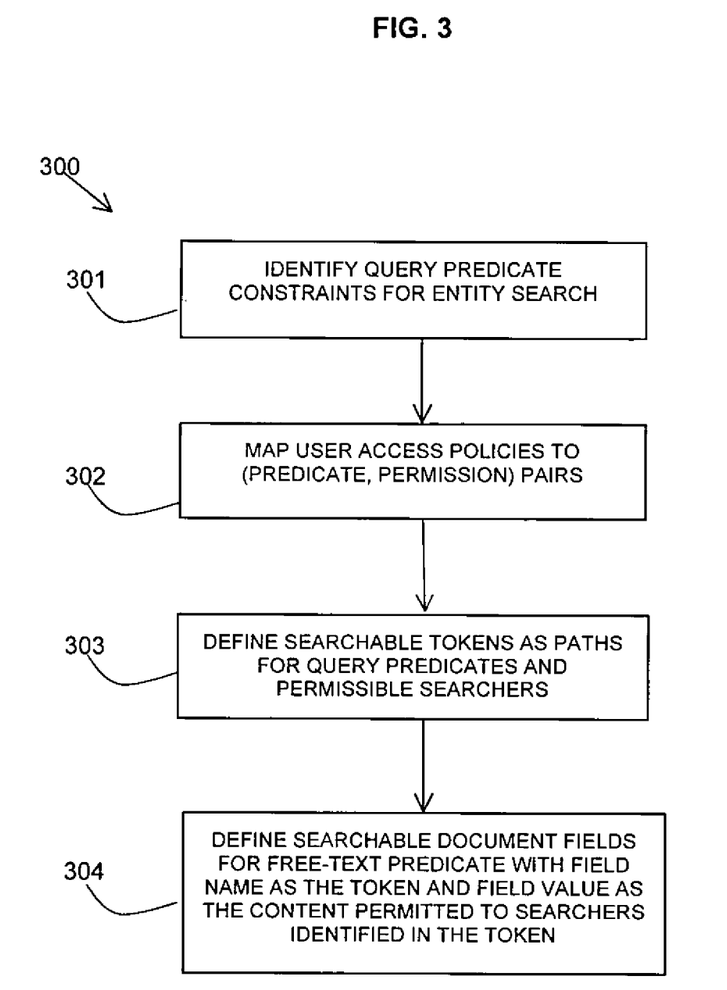
FIG. 3 is a flow diagram of an aspect of the method in accordance with the present invention.

Referring to FIG. 3, a flow diagram 300 shows the aspect of the described method of defining privacy or access control policies and extending entity documents to capture authorization rules. Query predicate constraints may be identified 301 for entity search. For example, in the described embodiment, the query predicates are entity type, entity attribute, relationship, and free-text as shown in FIG. 1.

User privacy or access control policies may be mapped 302 to query predicate-permission pairs, where the permission defines permitted searchers, such as a specific authority, an authority group, or public access.

Searchable tokens may be defined 303 as paths for the query predicate-permission pairs. Searchable document fields may be defined 304 for a free-text predicate with the field name as the searchable token defining permission and the field value as the content permitted to searchers identified in the token.

Figure 4A:
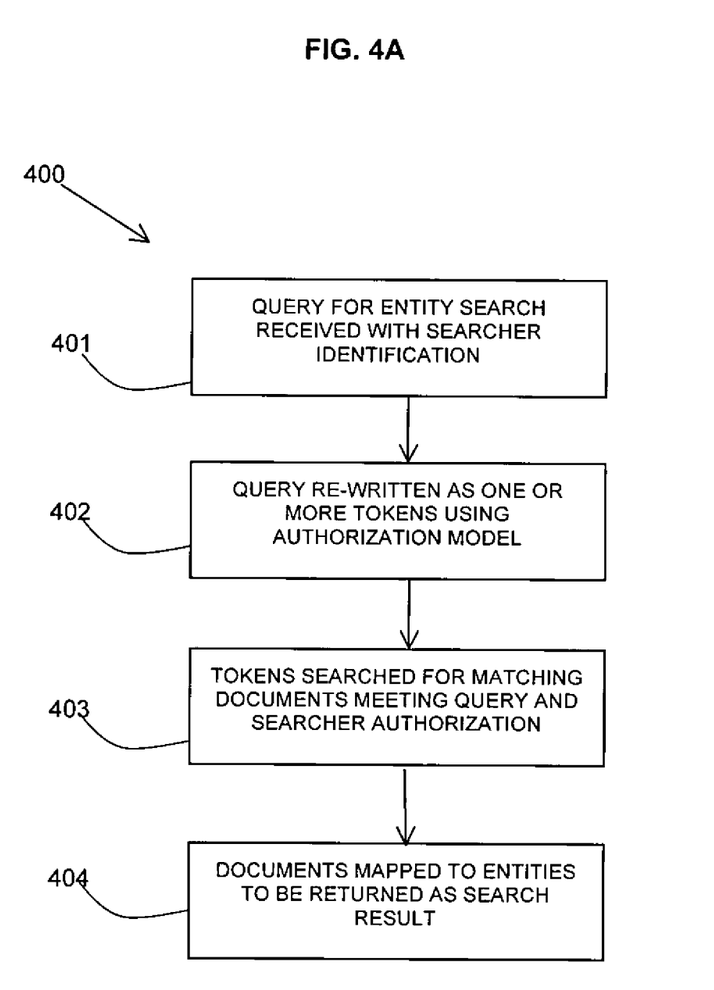
FIGS. 4A and 4B are flow diagrams of further aspects of the method in accordance with the present invention.

Referring to FIG. 4A, a flow diagram 400 shows a first embodiment of an aspect of the method at query runtime.

A query for entity search may be received 401 together with a searcher identification. The query may be rewritten 402 as one or more tokens using the authorization model by breaking the query into predicates based on interpretation by the search system with each predicate constraining entities to be returned. Predicates may be combined using Boolean expressions.

The token or tokens may be searched 403 to find documents meeting the query and searcher authorization. The documents may be mapped 404 to entities to be returned in the search result.

Figure 4B:
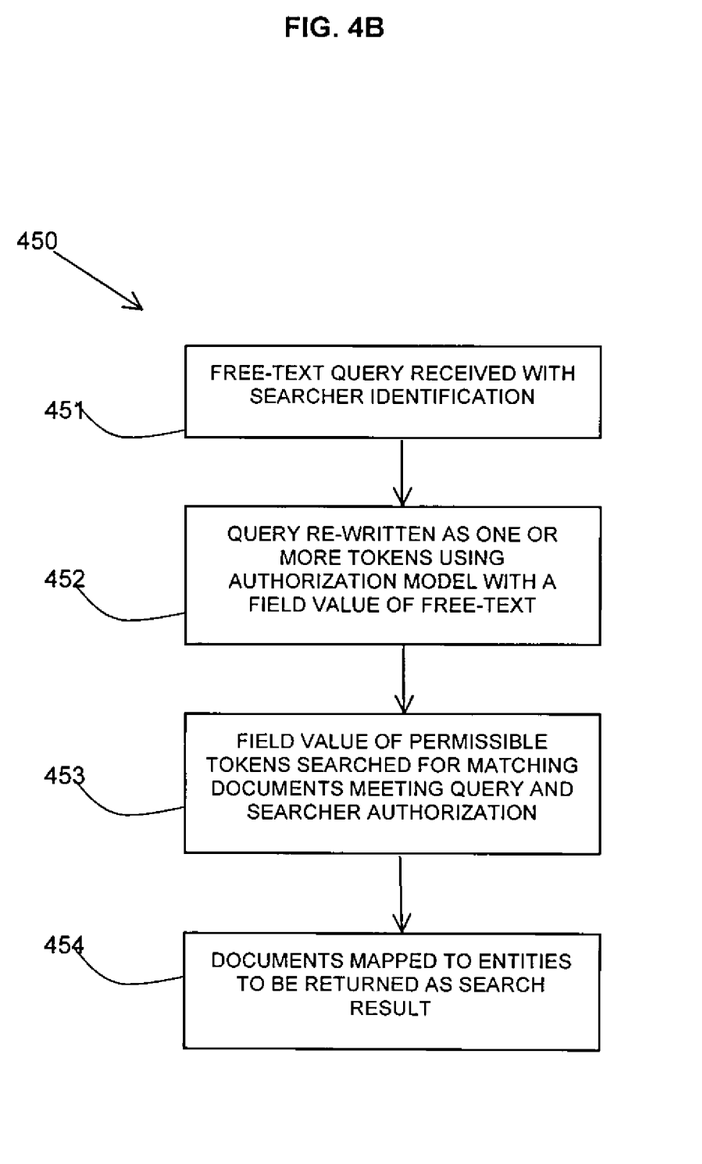

Referring to FIG. 4B, a flow diagram 450 shows a second embodiment of an aspect of the method at query runtime.

A free-text query for search may be received 451 together with a searcher identification. The query may be re-written 452 as one or more tokens with a field value of the free-text using the authorization model by breaking the query into predicates based on interpretation by the search system with each predicate constraining entities to be returned. Predicates may be combined using Boolean expressions.

The field value of permissible tokens may be searched 453 to find documents meeting the query and searcher authorization. The documents may be mapped 454 to entities to be returned in the search result.

Figure 5:
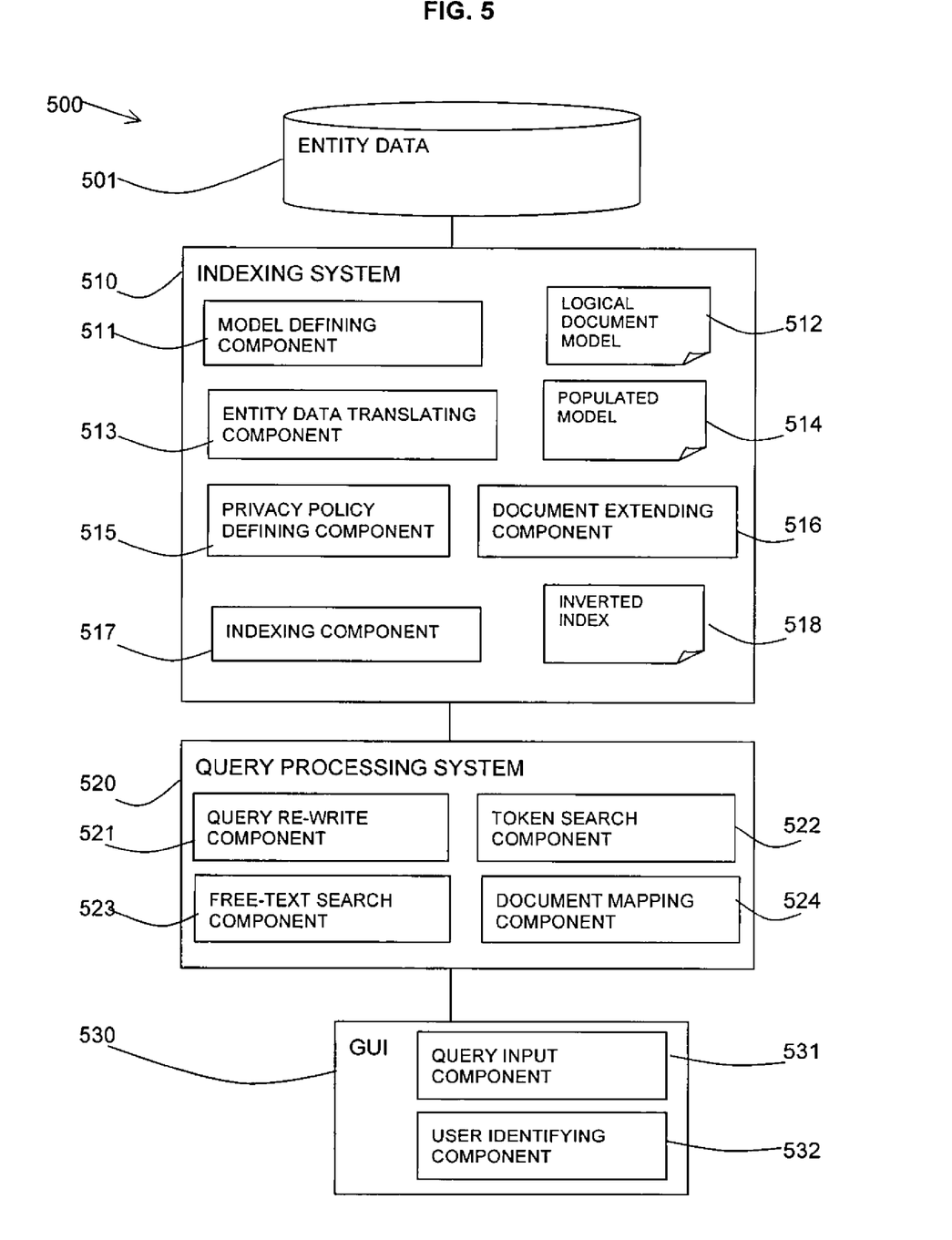
FIG. 5 is a block diagram of a system in accordance with the present invention.

Referring to FIG. 5, a block diagram 500 shows an embodiment of the described system 500.

An indexing system 510 is provided for indexing entity data 501 for searching. For example, the entity data 501 may include entity-relationship data. The indexing system 510 may include a model defining component 511 for defining a logical document model 512 of entity data 501. The indexing system 510 may also include an entity data translating component 513 for populating the logical document model 512 to provide a populated model 514.

The indexing system 510 may include a privacy policy defining component 515 for defining authorization tokens for users or groups of users. A document extending component 516 may be provided for extending the entity documents of the populated model 514 with searchable tokens capturing authorization rules over entities and relationships.

The indexing system 510 may also include an indexing component 517 for indexing the populated model 514 as an inverted index 518.

A query processing system 520 may be provided for receiving and processing search queries. A graphical user interface 530 may be provided with a query input component 531 and a user defining component 532. The query processing system 520 may include a query re-write component 521 for translating a received query into query predicates for an identified querying user. The query processing system 520 may include a token search component 522 for searching for authorization tokens in the index 518, and may include a free-text component 523 for searching for free-text content in field values of tokens in the index 518. A document mapping component 524 may be provided to map matched documents to entities which may be returned as a search result.

Figure 6:
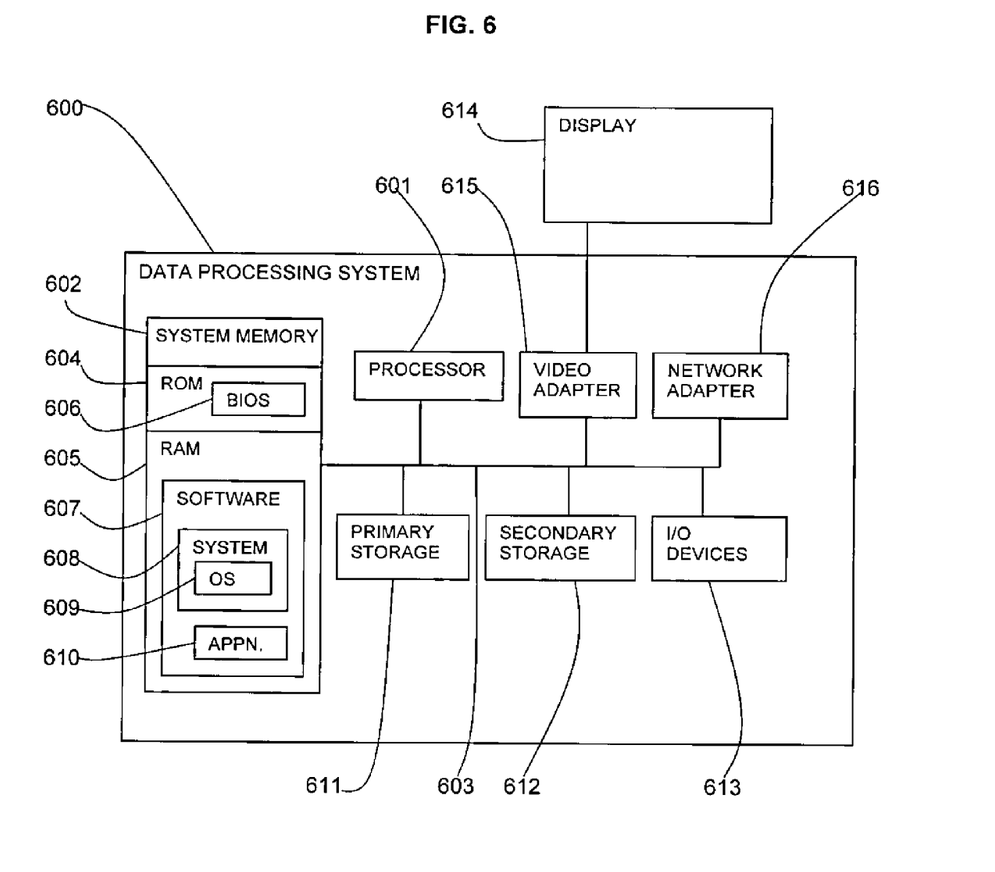
FIG. 6 is a block diagram of a computer system in which the present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements can include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. System software 607 may be stored in RAM 605 including operating system software 608. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 can be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

Example Use Case

Using a simple use case and sample queries, it is now demonstrated how the new authorization model may be used for enforcing privacy policies during entity search.

Figure 7:
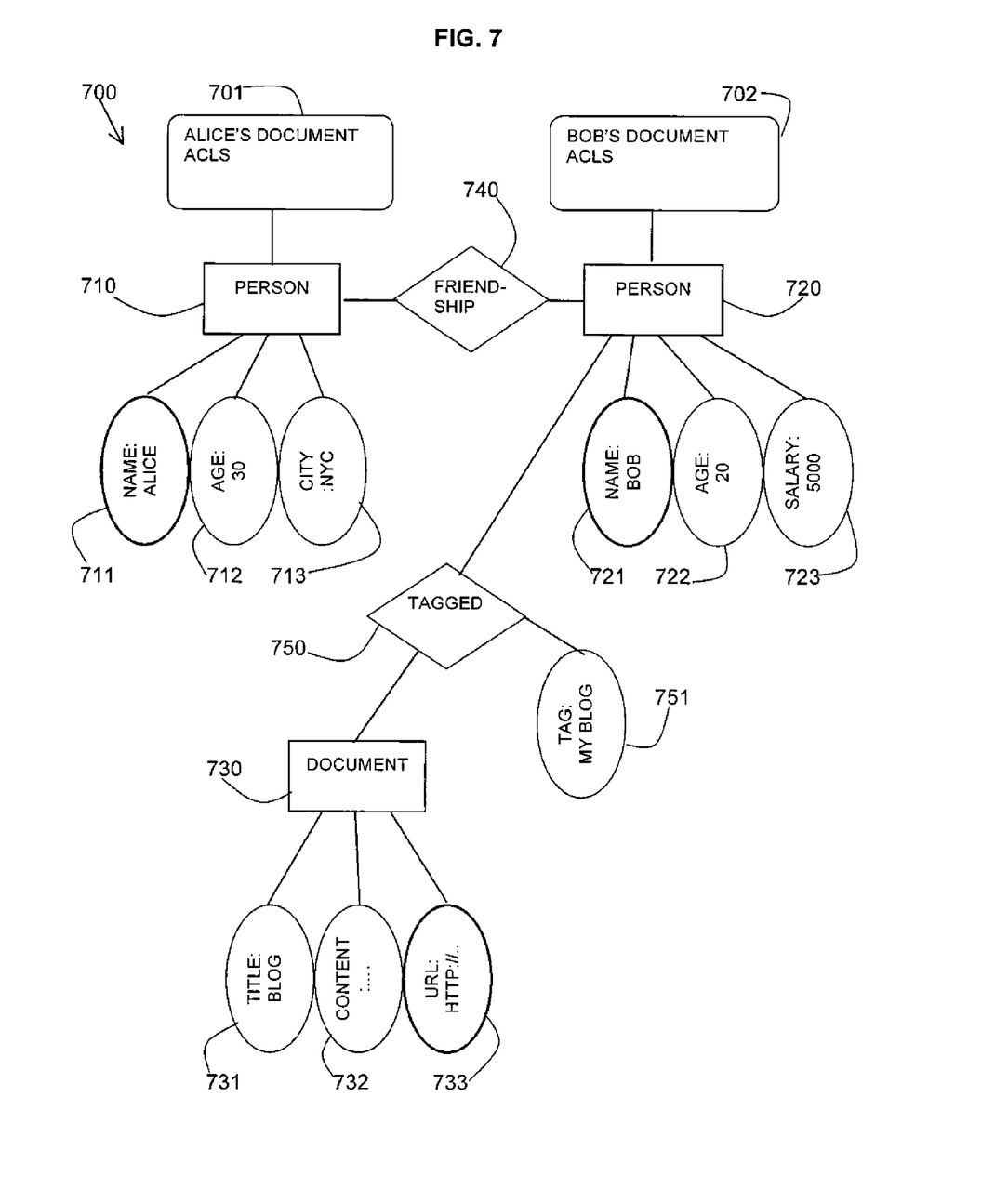
FIG. 7 is schematic diagram showing an example embodiment in accordance with the present invention.

FIG. 7 depicts an instance 700 with three entities; two persons 710, 720 (Alice and Bob) and a document 730. Bold lined ellipses 711, 721, 733 denote keys used to identify the entities 710, 720, 730. Each of the entities 710, 720, 730 has several attributes 711-713, 721-723, 731-733. Alice 710 and Bob 720 are friends and therefore have a friendship relationship 740 and Bob further has a tagged relationship 750 to the document 730, and the tagged relationship 750 has an attribute 751.

Alice permits everyone to discover her entity via entity type, relationships, or her name, while only Bob is permitted to discover her entity via her demographic attributes. Bob permits everyone to discover his entity based on his properties or friendship relationships, but no one except for Alice is permitted to discover his entity via his tagged relationships.

FIG. 7 further depicts above Alice's and Bob's entities 710, 720 the sets 701, 702 of ACL tokens and fields based on the described authorization model that captures Alice's and Bob's privacy policies, as follows.

Alice's document ACLs 701:

```
$ACL$/ENT/$PUBLIC$
$ACL$/ATT/name/$PUBLIC$
$ACL$/ATT/age/Bob
$ACL$/ATT/city/Bob
$ACL$/REL/Friendship/$PUBLIC$
$ACL$/CNT/$PUBLIC$:"person.Friendship.name.Alice"
$ACL$/CNT/Bob:"age.30.city.NY"
```

Bob's document ACLs 702:

```
$ACL$/ENT/$PUBLIC$
$ACL$/ATT/*/$PUBLIC$
$ACL$/REL/Tagged/Alice
$ACL$/REL/Friendship/$PUBLIC$
$ACL$/CNT/$PUBLIC$:"person.name.age.20.salary.5000.friendship"
$ACL$/CNT/Alice:"tagged"
```

Two example queries are now shown and their query rewrites using the model ACLs.

Example Query 1

It is assumed that Alice submitted the following free-text query "person tagged", which requires to return person entities who tagged some document. The following is the query rewrite using the described authorization model that guarantees that Alice can get Bob as an answer to her query:

```
$ACL$/CNT/$PUBLIC$: "person tagged" OR $ACL$/CNT/ALICE: "person tagged"
```

Example Query 2

Lets further assume that the search system interpreted Alice's query using the following predicate combination:
(e.type=Patient)AND (r.name=Tagged).
The following is a query rewrite using the described authorization model that again guarantees that Alice can get Bob as an answer to her query:

```
(e.type=Patient) AND (r.name=Tagged)
AND ($ACL$/ENT/Patient/$PUBLIC$ OR $ACL$/ENT/Patient/Alice)
AND ($ACL$/REL/Tagged/$PUBLIC$ OR $ACL$/REL/Tagged/Alice)
```

One application of the described method and system is social-medical discovery services. In spite of the relatively large number of new social-medical services, the adoption of such services by patients is still very limited, mainly due to privacy issues. Many patients are still unwilling to share their private personal data (either social or medical or both) due to privacy concerns that arise from using online social-medical services; such concerns include among others the service providers' trustfulness and their ability to make sure that patient's personal data is not leaked to unauthorized third parties. It is extremely important that a social-medical discovery technology will be designed to handle the wide range of possible privacy scenarios in a seamless and configurable way. Such technology should be both fine-grained and dynamic. A fine-grained approach supports the need to define who can access each piece of information in the patient's personal data. As an example, only the patient's psychiatrist can access the patient's psychiatric data, and only the patient's Infectious Disease (ID) physician can access the patient's HIV data, etc. A dynamic approach supports the need to change and adapt the original privacy policy definitions on the fly to reflect current regulations, legislation, or patient's desire.

With the described system, patients may be allowed to define a more fine-grained and dynamic privacy policy that can be used for further restricting the parts of their personal data that can be accessed at discovery time (e.g., treatment history, medications, family bonds, etc.) and under which circumstances (i.e., what kind of queries). Such flexibility in privacy policy definition is required if more patients are going to adapt to social-medical discovery services, be willing to share their data, and as a result, gain insights and benefit from such data sharing.

The proposed solution extends the traditional information retrieval concept of access control list (ACL) which can be used for defining flexible patient privacy policies and implemented within any social-medical discovery system. Using this solution, any patient privacy policy can be translated into a set of special access control tokens (ACLs) defined over indexed social and medical entities and their relationships, and can be efficiently enforced during search, allowing the support of both fine-grained and dynamic patient privacy policies.

Built on foundations of conceptual modeling, social data and medical data are fused together using a uniform representation in the form of a rich entity-relationship (ER) data graph. As a result, social discovery can be augmented with medical discovery and vice-versa.

It is assumed that patient privacy policies are specified in some format (e.g., P3P (Platform for Privacy Preferences, EPAL (Enterprise Privacy Authorization Language), XACML (eXtensible Access Control Markup Language, etc.), used to define for each entity or relationship associated with the patient's personal data (e.g., patient's consumed medications) the list of permissible authorities that can access this entity or relationship using search. Each patient privacy policy may be translated into a new set of special ACL tokens used for encoding the policy within the inverted-index.

The proposed privacy-aware extension may be implemented and integrated with a social-medical discovery (SMD) system to enable users to share their social and medical data and define various privacy policies for data sharing and discovery. User privacy policies are translated during indexing time into proper ACLs. Users of the SMD system may submit various queries referring to social-medical entities and their relationships (e.g., patient medications, allergies, etc.). The extended SMD system protects users' privacy during search by adding proper ACLs to each searcher's query.

Figure 8A:
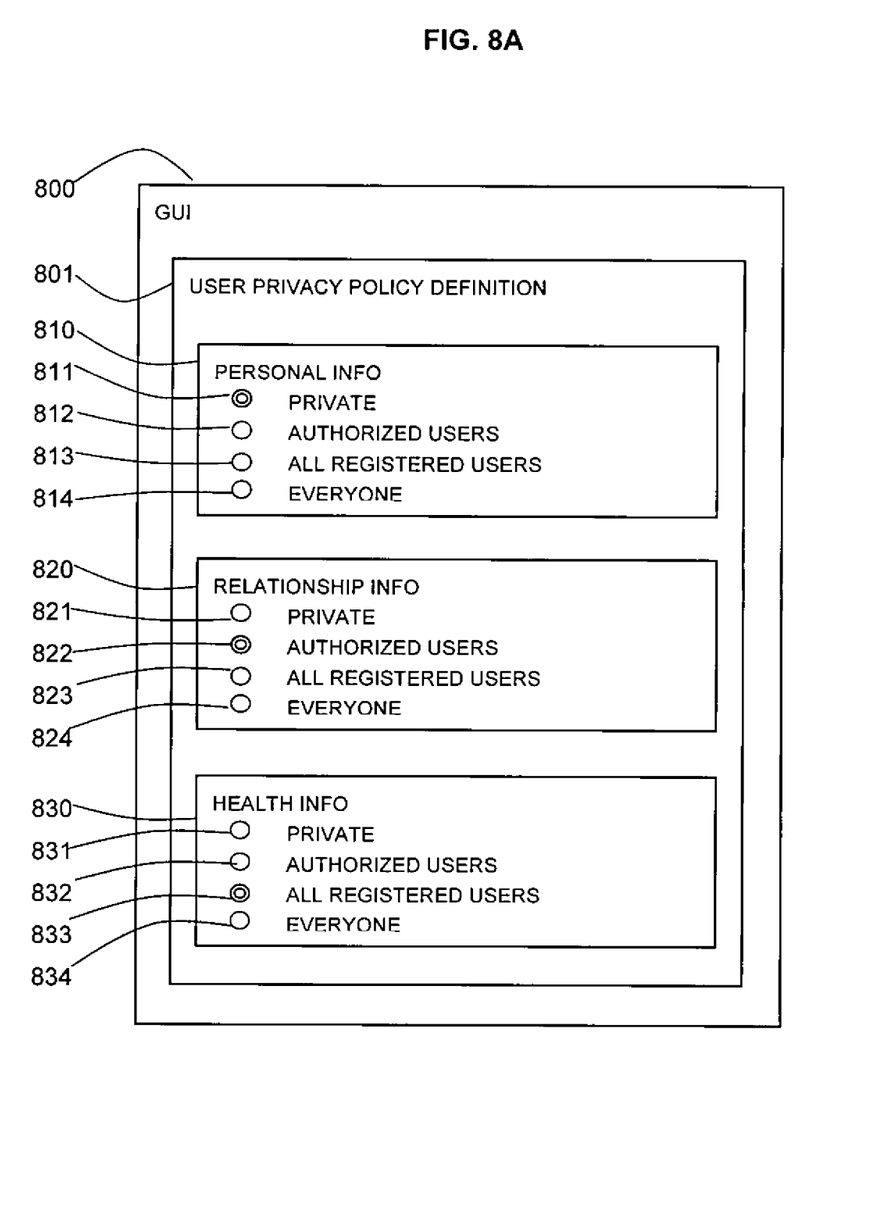
FIGS. 8A and 8B are diagrams showing graphical user interfaces for user access control in accordance with the present invention.

FIG. 8A depicts an example graphical user interface (GUI) 800 of a SMD system. The GUI 800 includes a user privacy policy definition window 801 for primary privacy policy definition. Patients can use this window 801 of the GUI 800 to define which portions of their social and medical data can be shared for social-medical discovery. In this example embodiment, there are three types of information for which privacy policies are defined by the user: personal information 810, relationship information 820, and health information 830. For each of the types of information 810, 820, 830, the access to the information may be defined as: private 811, 821, 831 in which case no-one can access the information except the user himself, authorized users 812, 822, 832 where the users authorized to access the information may be defined by the user, all registered users 813, 823, 833 where users registered to the service may access the information, and everyone 814, 824, 834 in which case everyone is able to access the information. In this example, the personal information 810 is kept private 811 by the user, the relationship information 820 is restricted to authorized users 822, and the health information 830 is available to all registered users 833.

Figure 8B:
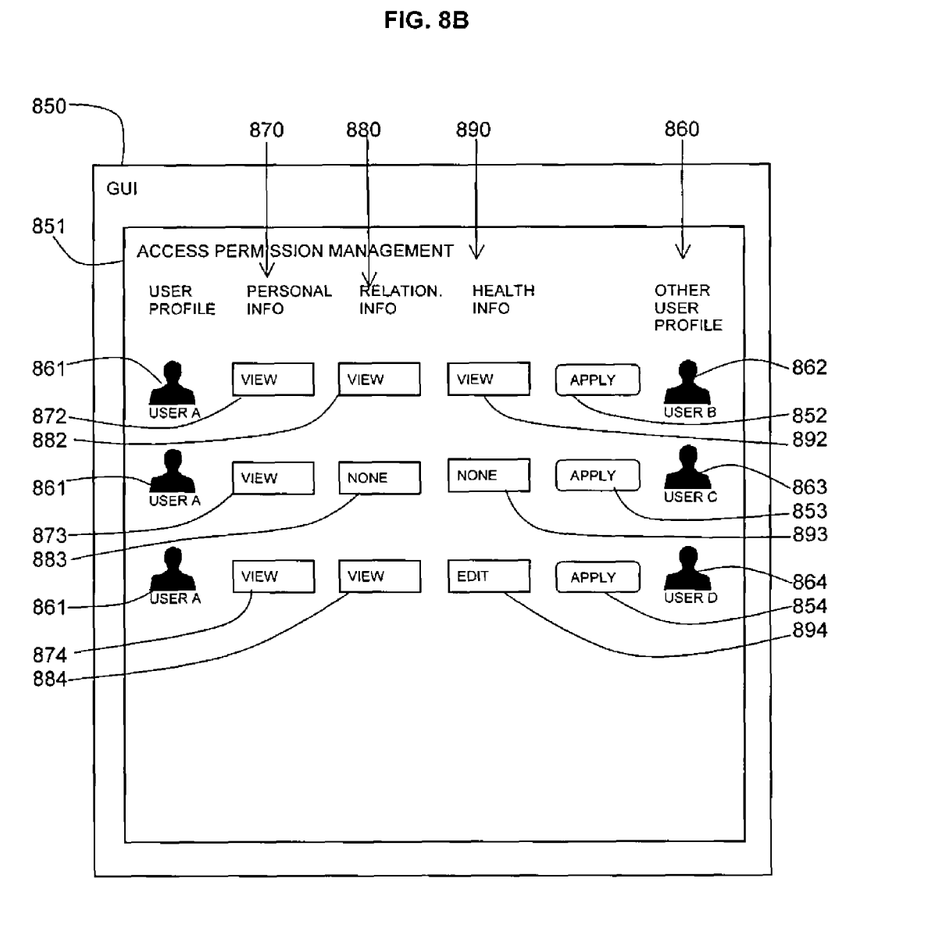

FIG. 8B further depicts a GUI 850 with an access permission management window 851 which allows patients to have a more fine-grained definition of their authorized parties (e.g., authorized family members, specific friends, treating physicians, etc.). A user A with a user profile 861 may specify for other user profiles 862, 863, 864 the settings 870, 880, 890 the user may have access to. In this example, the settings are for personal information 870, relationship information 880, and health information 890. For example, user A 861 may specify that user B 862 may view his personal information 872, his relationship information 882, and his health information 892. However, user A 861 may specify that user C 863 may view his personal information 873, but may not have access to his relationship information 883 or his health information 893. User A 861 may specify that user D may view his personal information 874 and his relationship information 884, and may edit his health information 894 setting. These settings may be applied for each user using an apply button 892, 893, 894.

Figure 9:
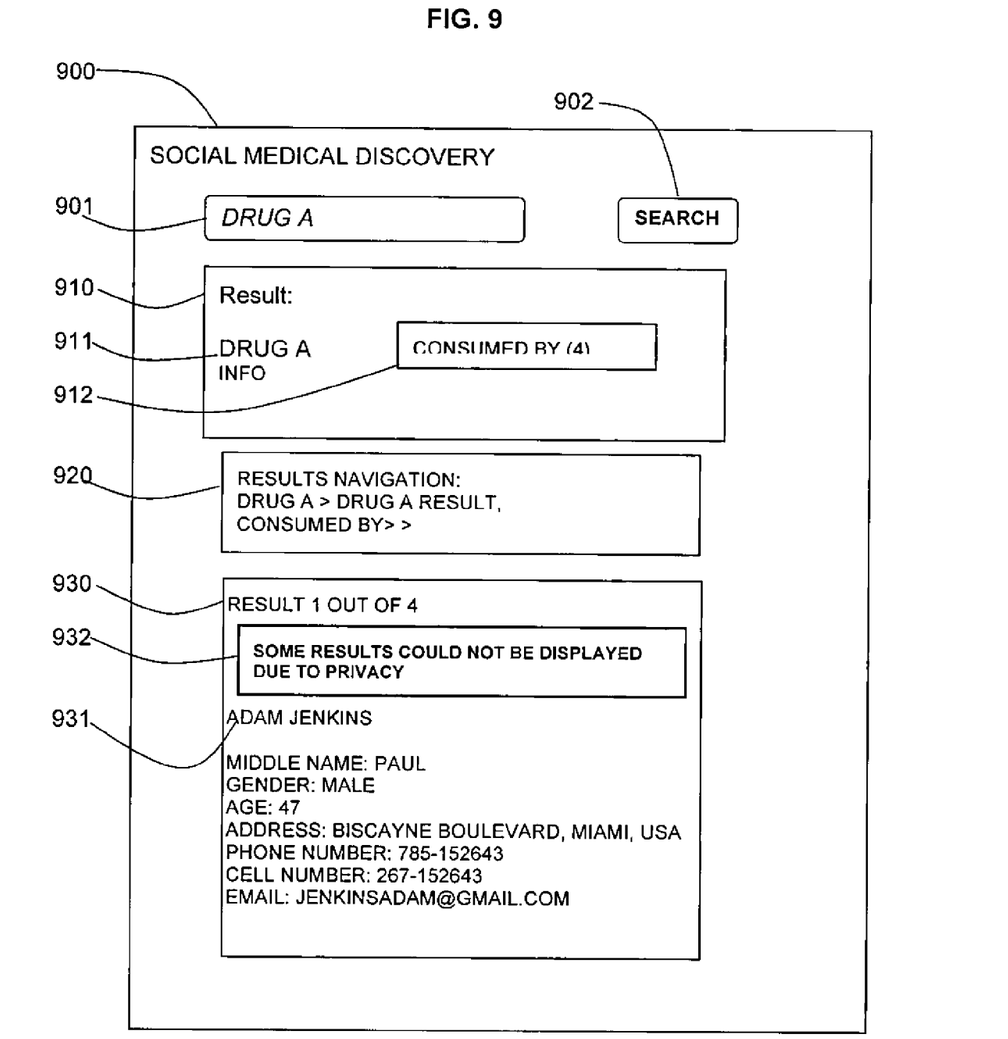
FIG. 9 is a diagram showing a graphical user interface of a search with access control in accordance with the present invention.

FIG. 9 depicts a main search GUI of a SMD system 900; illustrating the search result of an initial query "Drug A" 901 that was submitted to the system by the searcher Alice using a search button 902. An initial result 910 may be returned showing information 911 on the searched entity and with a relationship link 912 to other entities related to the search result, in this case the relationship of "Consumed by" of which there are four entities. The searcher click on the "Consumed by" relationship link 912 to return the list of relevant patients that consumed this medication. As shown, relationship results 930 are returned but the current searcher (Alice) was permitted to access the data 931 of only 1 out of 4 relevant patients, and has been further been notified about this fact by a notification 932 (i.e., "Some results could not be displayed due to privacy"). A results navigation 920 shows the navigation route taken by the searcher.

In spite of the relatively large number of existing social-medical services, the adoption of such services by patients is still very limited, mainly due to privacy issues. Existing social-medical discovery services support only strict patient privacy policies and are not flexible enough to accommodate a wider range of privacy policy definitions. The described privacy-aware social-medical discovery solution provides a highly flexible support for both fine-grained and dynamic patient privacy policies. Such flexibility in privacy policy definition will encourage more patients to adapt social-medical discovery services, be willing to share their data, and as a result, gain insights and benefit from such data sharing.

An entity search system allows a user to conduct both text based search and more structured search querying ER graphs. In some domains, like healthcare, CRM, intelligence, etc., control is required of what type of questions various users can perform on this data. Privacy policies are translated into a set of access rules defined over indexed entities and their relationships, and efficiently enforced during search.

The query-level authorization model described may be provided over semi-structured data encoded within an inverted index, and may include:
  Encoding of multiple ACLs with entity-relationship query semantics (ENT, ATT, CNT, REL);
  Interpreting user semi-structured query for deriving the set of ACLs per query predicate; and
  Special ACL encoding for content queries using multiple content fields.

The described method enables the user to access the document using different querying patterns.

Privacy filtering systems are usually rule-based, and can filter information only after the results are returned from search. The described method is for entity search domain, given a query and user identity, even without running the query it is like parts of the entity-relationship graphs were already filtered out. Hence, retrieving the top documents is correctly done (assuming the relevant answer set can contain only documents permitted for search). Furthermore, there is no problem in ranking, as similar to traditional ACL, documents to be ranked are only those which can be queried.

Access control for entity search may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of searching for entities matching a query, including:
   providing an inverted index of documents representing entities, the documents including:
   searchable content; and
   one or more permission tokens, at least one of the tokens including an identification of a permissible and a copy of a sub-portion of the searchable content of the document, including the entire searchable content of the entity that the identified permissible is allowed to search and not including the content of the document that the permissible is not allowed to search;
   receiving a free-text query for entity search with a searcher identification;
   re-writing the query as a combination of the free-text and of one or more tokens of the searcher identification, the tokens including:
   the searcher identification; and
   a content field having the free-text as its value; and
   searching the inverted index for documents having both:
   searchable content matching the query free-text, and
   a permission-token matching at least one of the one or more tokens of the rewritten query including the free-text.

2. The method of claim 1, wherein each of the entity documents includes one or more tokens indicating pairs of a permissible and corresponding data items the permissible is allowed to search.

3. A method of preparing an inverted index with access control information, comprising:
   providing entity data for a plurality of entities, each entity represented by a document including:
   searchable content;
   metadata indicating field names for at least some of the searchable content;
   one or more tokens indicating pairs of a permissible and a corresponding field of the document that the permissible is allowed to search;
   for each of the entities, performing by a computer:
   receiving indication of one or more permissibles having permission to access a respective portion of the content in the document of the entity;
   determining for each of the indicated permissibles a portion of the content of the document of the entity that the permissible is allowed to search; and
   defining for each indicated permissible, a respective record including an indication of the permissible, and a copy of a sub-portion of the searchable content of the document, including the entire searchable content of the document of the entity that the permissible is allowed to search and not including the content of the document that the permissible is not allowed to search; and
   creating an inverted index for the plurality of entities, based on the searchable content, the metadata, the tokens and the records, of the entities.

4. The method of claim 3, wherein the tokens comprise access control list (ACL) tokens.

5. The method of claim 4, wherein defining the records comprises defining records having the form of an ACL token together with the entire searchable content of the entity that the permissible is allowed to search.

6. The method of claim 3, wherein defining each record comprises including in each record the metadata names of the fields that the permissible is allowed to search.

7. The method of claim 3, wherein defining for each entity one or more records comprises defining in at least one document a plurality of records including an indication of a permissible, and the respective entire searchable content of the document that the permissible is allowed to search.

8. The method of claim 7, wherein each of the plurality of records of the document includes a different sub-portion of the content of the document.

9. Apparatus for preparing an inverted index with access control information, comprising:
 a memory storing entity data for a plurality of entities, each entity represented by a document including searchable content and metadata indicating field names for at least some of the searchable content, and for each entity, one or more tokens indicating pairs of a permissible and corresponding fields the permissible is allowed to search; and
 a processor configured to define, for each document, one or more records, each record including an indication of a permissible, and a copy of a sub-portion of the searchable content of the document, including the entire searchable content of the entity that the permissible is allowed to search and not including the content of the document that the permissible is not allowed to search, and to create an inverted index for the plurality of entities, for the searchable content, the metadata, the tokens and the records.

10. The apparatus of claim 9, wherein the tokens comprise access control list (ACL) tokens.

11. The apparatus of claim 10, wherein the processor is configured to define the records in a form of an ACL token together with the entire searchable content of the entity that the permissible is allowed to search.

\* \* \* \* \*